(12) United States Patent
Konishi et al.

(10) Patent No.: US 10,590,806 B2
(45) Date of Patent: Mar. 17, 2020

(54) EXHAUST SYSTEM AND GAS TURBINE

(71) Applicant: MITSUBISHI HITACHI POWER SYSTEMS, LTD., Kanagawa (JP)

(72) Inventors: Tetsu Konishi, Kanagawa (JP); Yoshiyuki I, Kanagawa (JP); Tomoyuki Hirata, Kanagawa (JP); Tomoto Nagai, Tokyo (JP); Yoshiko Takei, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 233 days.

(21) Appl. No.: 15/521,717

(22) PCT Filed: Oct. 20, 2015

(86) PCT No.: PCT/JP2015/079609
§ 371 (c)(1),
(2) Date: Apr. 25, 2017

(87) PCT Pub. No.: WO2016/067978
PCT Pub. Date: May 6, 2016

(65) Prior Publication Data
US 2017/0241295 A1     Aug. 24, 2017

(30) Foreign Application Priority Data

Oct. 29, 2014 (JP) .................. 2014-220680

(51) Int. Cl.
*F01D 25/30* (2006.01)
*F01D 25/24* (2006.01)
(Continued)

(52) U.S. Cl.
CPC ............. *F01D 25/30* (2013.01); *F01D 25/12* (2013.01); *F01D 25/14* (2013.01); *F01D 25/162* (2013.01);
(Continued)

(58) Field of Classification Search
CPC ........ F01D 25/30; F01D 25/305; F01D 25/12; F01D 25/24; F01D 25/28; F01D 9/04;
(Continued)

(56) References Cited

U.S. PATENT DOCUMENTS

| | | | |
|---|---|---|---|
| 4,187,054 A * | 2/1980 | Landis, Jr. ................ | F01D 5/18 415/115 |
| 7,007,488 B2 * | 3/2006 | Orlando .................. | F01D 9/065 60/782 |

(Continued)

FOREIGN PATENT DOCUMENTS

| JP | 6-173712 | 6/1994 |
|---|---|---|
| JP | 2005-83199 | 3/2005 |
| JP | 2013-57302 | 3/2013 |

OTHER PUBLICATIONS

International Search Report dated Jan. 19, 2016 in International (PCT) Application No. PCT/JP2015/079609.

*Primary Examiner* — Steven M Sutherland
*Assistant Examiner* — Thuyhang N Nguyen
(74) *Attorney, Agent, or Firm* — Wenderoth, Lind & Ponack, L.L.P.

(57) ABSTRACT

An exhaust system and a gas turbine, in which the exhaust system includes an exhaust casing; an outer diffuser supported inside the exhaust casing; an inner diffuser disposed inside the outer diffuser to form an exhaust gas flow passage between the inner diffuser and the outer diffuser; a strut cover coupled at a first end to the outer diffuser and coupled at a second end to the inner diffuser; and a second cooling air introduction port provided in the exhaust casing, further on the downstream side of the exhaust gas flow passage than the strut cover. Furthermore, a non-perforated partition member having an annular shape is arranged so as to cover (Continued)

the outer side of the outer diffuser and is supported by the exhaust casing to form a cooling air flow passage.

13 Claims, 6 Drawing Sheets

(51) Int. Cl.
*F02C 7/18* (2006.01)
*F01D 25/16* (2006.01)
*F01D 25/12* (2006.01)
*F01D 25/14* (2006.01)
*F01D 25/26* (2006.01)

(52) U.S. Cl.
CPC .............. *F01D 25/24* (2013.01); *F01D 25/26* (2013.01); *F02C 7/18* (2013.01)

(58) Field of Classification Search
CPC .......... F01D 25/14; F01D 25/25; F01D 25/26; F05D 2240/11; F05D 2240/81
See application file for complete search history.

(56) References Cited

U.S. PATENT DOCUMENTS

| | | |
|---|---|---|
| 2005/0050898 A1 | 3/2005 | Noda |
| 2011/0005234 A1* | 1/2011 | Hashimoto ............. F01D 25/30 60/796 |
| 2013/0064647 A1 | 3/2013 | Hashimoto |
| 2013/0149121 A1 | 6/2013 | Munshi et al. |

\* cited by examiner

EXHAUST SYSTEM AND GAS TURBINE

TECHNICAL FIELD

The present invention relates to an exhaust system that treats exhaust gas discharged from a gas turbine, for example, and to a gas turbine.

BACKGROUND ART

For example, a gas turbine is typically composed of a compressor, a combustor, and a turbine. The compressor compresses air, taken in through an air inlet, into high-temperature high-pressure compressed air. The combustor supplies fuel to this compressed air and combusts the mixture to produce high-temperature high-pressure combustion gas. The turbine is driven by this combustion gas, and in turn drives a generator coupled coaxially to the turbine.

In this gas turbine, an exhaust system is provided on the downstream side of the turbine. The turbine has a plurality of vanes and a plurality of blades installed inside a turbine casing, alternately in the combustion gas flow direction. An exhaust chamber is installed on the downstream side of the turbine casing through an exhaust casing. This exhaust chamber has an exhaust diffuser that is supported by the exhaust casing. The exhaust diffuser is composed of cylindrical outer diffuser and inner diffuser that are coupled together by strut shields. Struts are each coupled at one end to a bearing that supports a rotor and coupled at the other end to the exhaust casing. Cooling air from the outside is drawn into the gap between the strut and the strut shield to cool the exhaust diffuser.

Japanese Patent Laid-Open No. H06-173712 (JP 06-173712) discloses a perforated plate that is provided at the inlet of an exhaust diffuser cooling system to which a cooling fluid delivered through a guide pipe of a cooling unit is supplied, and that divides a cooling fluid passage of the exhaust diffuser cooling system into a non-heated part for cooling the exhaust diffuser and a heated part for cooling a turbine stage casing. This perforated plate is intended to block radiation heat to eliminate the possibility that the cooling fluid may be overheated by being exposed to heat radiation from the exhaust diffuser and fail to sufficiently cool the turbine stage casing. Part of the cooling fluid supplied to the exhaust diffuser passes through the perforated plate and is supplied to the non-heated part for cooling the exhaust diffuser, and cools the exhaust diffuser before being discharged to the outside.

Japanese Patent Laid-Open No. 2005-083199 (JP 2005-083199) discloses a second cooling system that is defined by a partition wall provided on the outer circumferential side of an inner circumferential casing, and forms an air chamber between the inner circumferential casing and the partition wall.

As described above, the conventional exhaust diffuser is cooled by drawing in cooling air from the outside into the gap between the strut and the strut shield. However, to meet recent demands for higher-power gas turbines, the exhaust gas temperature needs to be raised, which requires further cooling of the exhaust diffuser. In that case, it is conceivable to increase the amount of cooling air drawn from the outside into the gap between the strut and the strut shield. The problem is that this may result in lower turbine efficiency due to lower exhaust gas temperature, as air having cooled the exhaust diffuser is discharged to the exhaust gas flow passage.

The perforated plate disclosed in JP 06-173712 has a structure that allows passage of a cooling fluid, so that the passage formed between the perforated plate and the outer diffuser does not have high cooling efficiency nor good cooling performance. On the other hand, the air chamber disclosed in JP 2005-083199 is not provided on the outer diffuser. Mounting the air chamber disclosed in JP 2005-083199 on the outer diffuser disclosed in JP 06-173712 will pose a challenge of how to support the load that would be placed on the outer diffuser.

Having been devised to solve the above problems, the present invention aims to provide an exhaust system and a gas turbine that can efficiently cool the exhaust diffuser.

SUMMARY OF THE INVENTION

An exhaust system according to one aspect of the present invention to achieve the above object includes: a casing having an annular shape; an outer diffuser having an annular shape and supported on the radially inner side of the casing; an inner diffuser having an annular shape and disposed on the radially inner side of the outer diffuser to form an exhaust gas flow passage between the inner diffuser and the outer diffuser; a strut cover having a cylindrical shape, and coupled at one end in a longitudinal direction to the outer diffuser and coupled at the other end to the inner diffuser; a cooling air introduction portion provided in the casing, further on the upstream side or the downstream side of the exhaust gas flow passage than the strut cover; a partition member having an annular shape so as to cover the radially outer side of the outer diffuser and supported by the casing; and a cooling air flow passage provided between the outer diffuser and the partition member and formed so as to guide cooling air, introduced from the cooling air introduction portion, to a strut cover flow passage inside the strut cover.

Thus, the partition member is additionally provided on the outer side of the outer diffuser so as to form the cooling air flow passage having a smaller flow passage area than in the conventional structure, so that the outer diffuser cooling performance can be improved. Moreover, as this partition member is supported from the casing, the mounting structure is simplified and the maintainability is improved.

In the exhaust system according to one aspect of the present invention, the partition member is disposed annularly in the axial direction, with one axial end being a free end not fixed at the end while the other end being a fixed end fixed to the casing. The cooling air flow passage is disposed so as to form a flow passage leading from the free end toward the fixed end.

Thus, the entire amount of cooling air supplied from the cooling air introduction portion flows through the cooling air flow passage that turns around at the free end of the partition member and extends toward the fixed end. Accordingly, cooling of the outer diffuser is promoted, and the cooling air flows smoothly into the strut cover flow passage.

In the exhaust system according to one aspect of the present invention, the outer diffuser is supported at one axial end by the casing through a support member that is disposed annularly in a circumferential direction, and the partition member is disposed on the radially inner side relative to the support member.

Thus, the partition member can be disposed on the radially inner side of the support member that supports the outer diffuser. Accordingly, it is possible to reduce the flow passage cross-sectional area of the cooling air flow passage, and to thereby enhance the cooling of the outer diffuser, by bringing the partition member closer to the outer diffuser to such an extent that no interference occurs.

In the exhaust system according to one aspect of the present invention, the support member is formed by a plurality of segments that are divided with a space left in between in the circumferential direction, and the segments are mounted so that, when seen from the axial direction, at least one or more of the spaces are provided between the segments and the strut covers that are disposed in the circumferential direction.

Thus, dispersion of the cooling air in the circumferential direction is promoted as the cooling air supplied from the cooling air introduction portion passes through the spaces between the support members.

In the exhaust system according to one aspect of the present invention, the segments are disposed adjacent to one another in the circumferential direction, and the segments fixed at one axial end to the casing and fixed at the other end to a radially outer wall surface of the outer diffuser are disposed so that the space between the adjacent segments has a certain width in the axial direction.

Thus, the spaces are formed between the segments evenly in the circumferential direction, so that the flow rate of cooling air flowing through the cooling air flow passage is evened out in the circumferential direction.

In the exhaust system according to one aspect of the present invention, the partition member is divided into a plurality of parts in the circumferential direction, and a seal member is provided at each end in the circumferential direction of the divided partition member parts.

Thus, as the partition member parts are sealed at both ends with the seal member, the cooling air entering the cooling air flow passage flows into the cooling air flow passage from the free end side without taking a shortcut, so that the flow of cooling air is evened out in the circumferential direction. Moreover, as the partition member parts can be removed part by part, the maintainability is improved.

In the exhaust system according to one aspect of the present invention, the cooling air flow passage is provided on the outer side of a coupled portion of the strut cover and the outer diffuser.

Thus, the thermal stress of exhaust gas concentrates at the coupled portion of the strut cover and the outer diffuser, but the cooling air cools this coupled portion when passing through the cooling air flow passage. Accordingly, the thermal stress acting on the coupled portion of the strut cover and the outer diffuser can be reduced.

In the exhaust system according to one aspect of the present invention, the cooling air introduction portion is provided so as to face the partition member from the radially outer side.

Thus, the cooling air introduced from the cooling air introduction portion into the casing is evened out in the circumferential direction in the course of passing through the support member and the partition member, and is then guided through the cooling air flow passage into the strut cover. In this way, the cooling air can cool the outer diffuser evenly in the circumferential direction.

In the exhaust system according to one aspect of the present invention, a room having an annular shape is provided between the casing and the partition member. The cooling air introduction portion communicates with the room, and the cooling air flow passage communicates at one end with the room and communicates at the other end with the inside of the strut cover.

Thus, the cooling air introduced from the cooling air introduction portion into the casing enters the cooling air flow passage via the room that has a certain volume. As this room functions as a buffer tank so that the cooling air is evened out in the circumferential direction inside the room before flowing into the cooling air flow passage, the cooling air can cool the outer diffuser evenly in the circumferential direction.

In the exhaust system according to one aspect of the present invention, a plurality of the cooling air introduction portions are provided at predetermined intervals in the circumferential direction.

Thus, the cooling air can be introduced into the casing evenly in the circumferential direction.

A gas turbine according to one aspect of the present invention includes: a compressor that compresses air; a combustor that mixes and combusts compressed air compressed by the compressor and fuel; a turbine that obtains rotational power from combustion gas generated by the combustor; and the exhaust system that treats exhaust gas discharged from the turbine.

Thus, the outer diffuser can be cooled efficiently with a low flow of cooling air, so that an increase in amount of cooling air can be suppressed as well as an increase in amount of cooling air discharged to the exhaust gas flow passage can be suppressed. Accordingly, it is possible to prevent a decrease in exhaust gas temperature and maintain the turbine efficiency.

Advantageous Effects of Invention

According to the exhaust system and the gas turbine of at least one aspect of the present invention, the cooling air flow passage having a small flow passage area and guiding cooling air into the strut cover is provided between the partition member supported from the casing and the radially outer surface of the outer diffuser. Thus, the flow velocity of the cooling air inside the cooling air flow passage is increased, and the outer diffuser cooling performance is improved. Moreover, the outer diffuser can be cooled efficiently with a low flow of cooling air, so that the power generation efficiency can be improved. Furthermore, as the partition member is supported from the casing, the structure is simplified and the maintainability is improved.

DESCRIPTION OF EMBODIMENTS

A preferred embodiment of an exhaust system and a gas turbine according to the present invention will be described in detail below with reference to the accompanying drawings. However, the present invention is not limited by this embodiment, and if there are a plurality of embodiments, the invention also includes other embodiments configured by combining the embodiments.

[First Embodiment]

Figure 4:
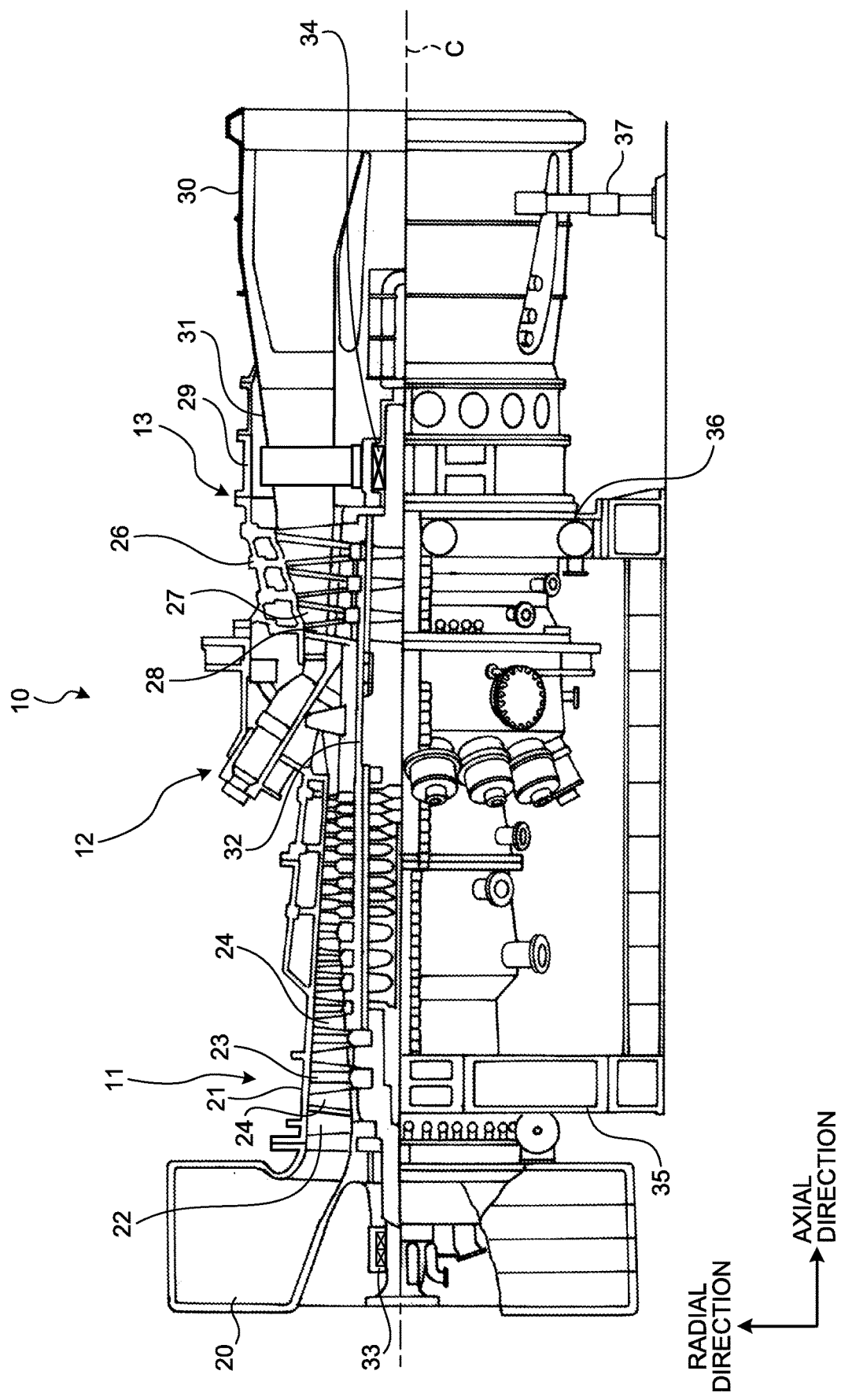
FIG. 4 is a schematic view showing the overall configuration of the gas turbine.

FIG. 4 is a schematic view showing the overall configuration of a gas turbine of a first embodiment.

In the first embodiment, as shown in FIG. 4, a gas turbine 10 is mainly composed of a compressor 11, a combustor 12, and a turbine 13. In the gas turbine 10, the compressor 11 and the turbine 13 are disposed on the outer side of a rotor (rotating shaft) 32 along the direction of a shaft center C (hereinafter, an axial direction), and the plurality of combustors 12 are disposed between the compressor 11 and the turbine 13. The gas turbine 10 can generate electricity with a generator (electric motor) (not shown) coaxially coupled thereto.

The compressor 11 has an air inlet 20 through which air is taken in. Inside a compressor casing 21, inlet guide vanes (IGVs) 22 are installed, and a plurality of vanes 23 and a plurality of blades 24 are installed alternately in an air flow direction (direction of the shaft center C). The compressor 11 compresses air taken in through the air inlet 20 to generate high-temperature high-pressure compressed air, and supplies this compressed air to the combustors 12. The compressor 11 can be started by an electric motor coaxially coupled thereto.

The combustor 12 is supplied with fuel and the high-temperature high-pressure compressed air compressed in the compressor 11 and accumulated in a turbine casing 26, and combusts the mixture to generate combustion gas. In a turbine 13, a plurality of vanes 27 and a plurality of blades 28 are installed inside the turbine casing 26, alternately in a combustion gas flow direction (axial direction). An exhaust chamber 30 is installed on the downstream side of the turbine casing 26 through an exhaust casing 29. The exhaust chamber 30 has an exhaust diffuser 31 coupled to the turbine 13. The turbine 13 is driven by the combustion gas from the combustors 12, and can in turn drive the generator coaxially coupled to the turbine 13.

The rotor 32 extending in the axial direction so as to penetrate a center part of the exhaust chamber 30 is disposed inside the compressor 11, the combustor 12, and the turbine 13. The rotor 32 is rotatably supported at the end located on the side of the compressor 11 by a bearing 33, and is rotatably supported at the other end located on the side of the exhaust chamber 30 by a bearing 34. In the compressor 11, a stack of a plurality of discs each having the blades 24 mounted thereon is fixed to the rotor 32. In the turbine 13, a stack of a plurality of discs each having the blades 28 mounted thereon is fixed to the rotor 32. A drive shaft of the generator is coupled to the end of the rotor 32 located on the side of the air inlet 20.

The gas turbine 10 has the compressor casing 21 of the compressor 11, the turbine casing 26 of the turbine 13, and the exhaust chamber 30 respectively supported by a leg 35, leg 36, and leg 37.

Thus, air taken in through the air inlet 20 is compressed into high-temperature high-pressure compressed air in the compressor 11 by passing through the inlet guide vanes 22 and the pluralities of vanes 23 and blades 24. In the combustor 12, predetermined fuel is supplied to this compressed air and the mixture is combusted. In the turbine 13, the high-temperature high-pressure combustion gas generated in the combustor 12 passes through the pluralities of vanes 27 and blades 28 inside the turbine 13, thereby driving the rotor 32 to rotate and driving the generator coupled to the rotor 32 to rotate. The combustion gas having driven the turbine 13 is released as exhaust gas into the atmosphere.

Figure 1:
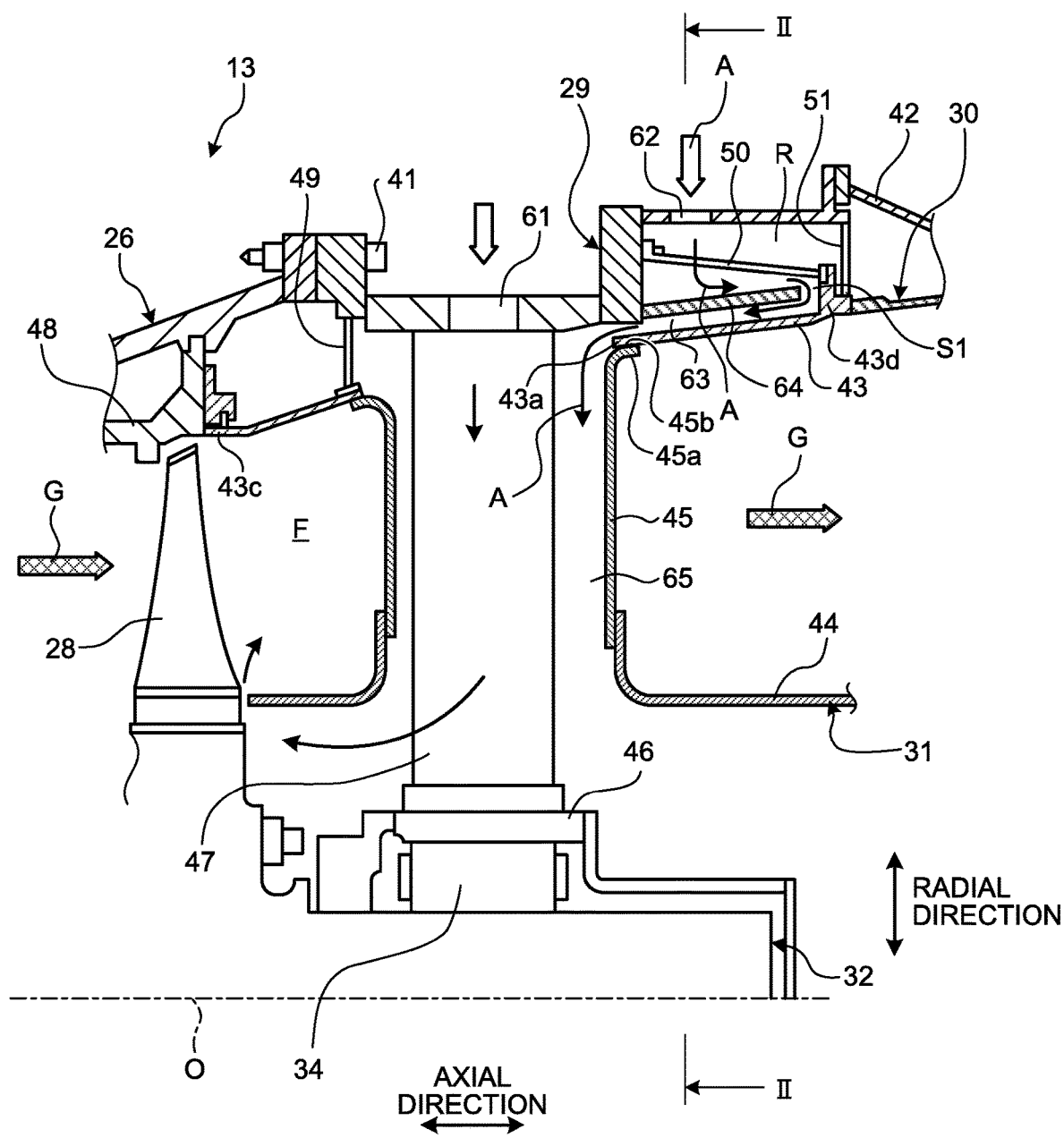
FIG. 1 is a sectional view showing an exhaust system of a first embodiment.
Figure 2:
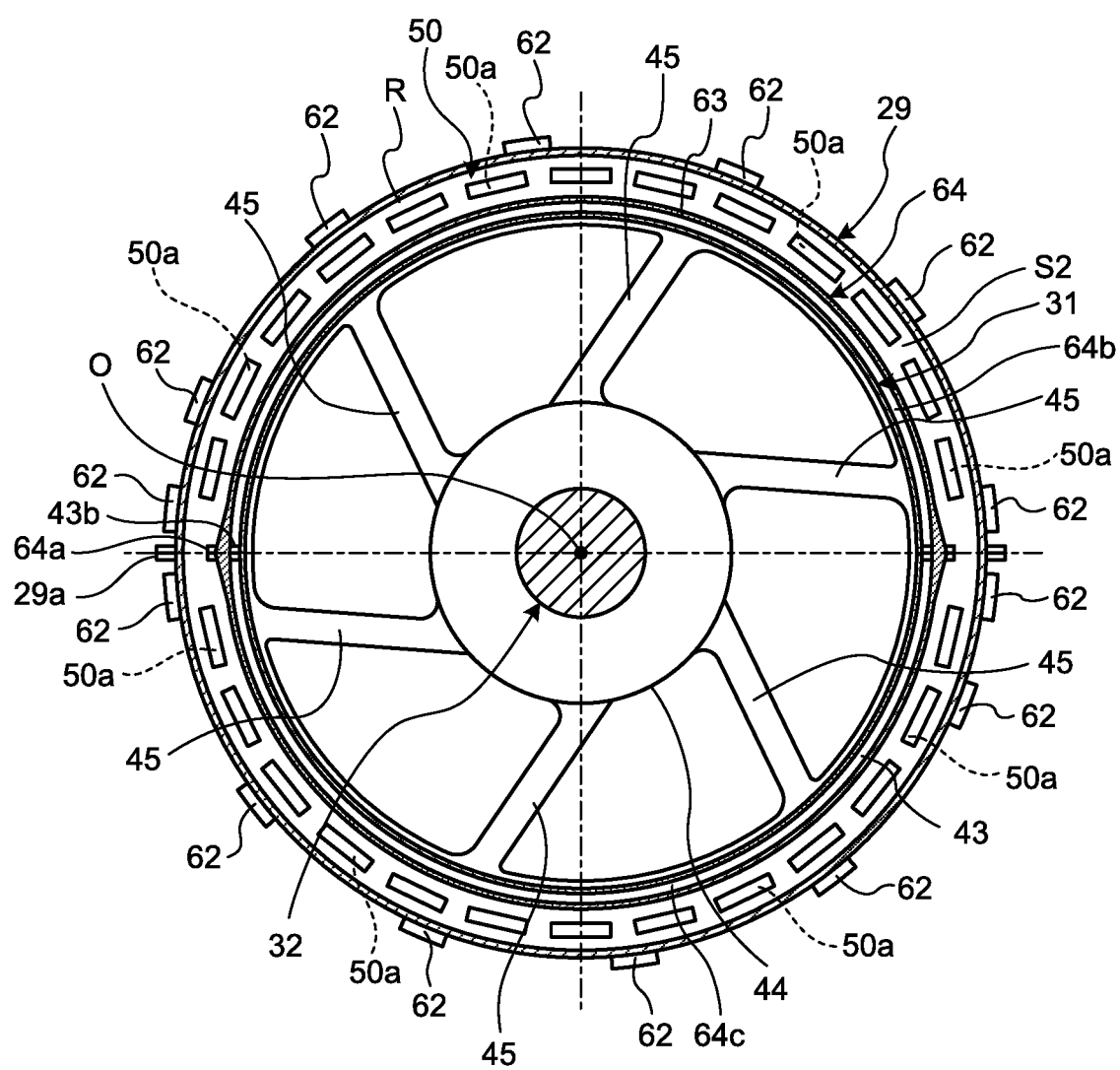
FIG. 2 is a sectional view taken along the line II-II of FIG. 1, showing the exhaust system.
Figure 3:
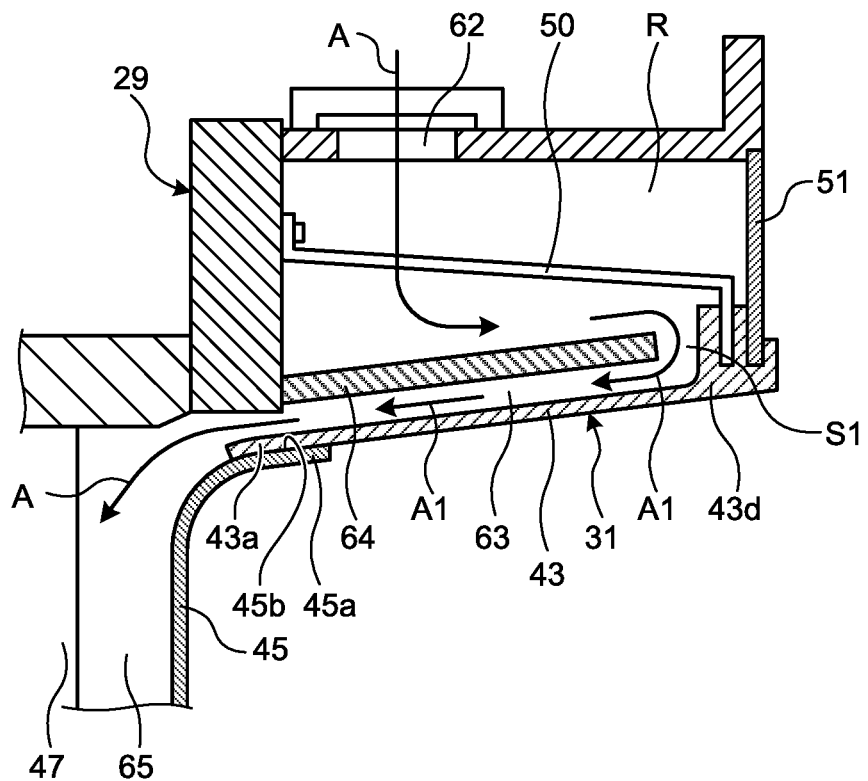
FIG. 3 is a sectional view showing a second cooling air introduction port in the exhaust system.

The gas turbine 10 thus configured is provided with an exhaust system that treats exhaust gas discharged from the turbine 13. FIG. 1 is a sectional view showing the exhaust system of the first embodiment; FIG. 2 is a sectional view taken along the line II-II of FIG. 1, showing the exhaust system; and FIG. 3 is a sectional view showing a second cooling air introduction port in the exhaust system. In the following description, the direction of the shaft center of the rotor 32 is the axial direction, which is the flow direction of combustion gas (exhaust gas) G. The upstream side in the flow direction of the combustion gas (exhaust gas) G and the downstream side in the flow direction of the combustion gas (exhaust gas) G are referred to as the front side and the rear side, respectively.

As shown in FIG. 1 and FIG. 2, the turbine casing 26 has a cylindrical shape (annular shape), and has the pluralities of vanes 27 and blades 28 installed alternately in the axial direction. The exhaust casing 29 is disposed on the downstream side of the turbine casing 26 in the flow direction of the combustion gas G, and is coupled to the turbine casing 26 with fastening bolts 41. The exhaust casing 29 has a cylindrical shape, and the exhaust chamber 30 is disposed on the downstream side of the exhaust casing 29 in the flow direction of the combustion gas G. The exhaust chamber 30 has a cylindrical shape (annular shape). The exhaust casing 29 and the exhaust chamber 30 are coupled together by an exhaust chamber support 42 that can absorb thermal elongation.

The exhaust diffuser 31 having a cylindrical shape is disposed inside the exhaust casing 29. The exhaust diffuser 31 is composed of cylindrical (annular) outer diffuser 43 and inner diffuser 44 that are coupled together by strut covers (strut shields) 45. The strut cover 45 has a hollow structure with a cylindrical shape, elliptical cylindrical shape, etc., and is inclined in the circumferential direction at a predetermined angle from the radial direction, and a plurality of (in this embodiment, six) strut covers 45 are provided at regular intervals in the circumferential direction of the exhaust diffuser 31. As the inner diffuser 44 is disposed on the radially inner side of the outer diffuser 43, an exhaust gas flow passage F through which the exhaust gas (combustion gas) G flows is formed between the outer and inner diffusers 43, 44 of the exhaust diffuser 31.

The rotor 32 is rotatably supported by the bearing 34, and the bearing 34 is supported from the exhaust casing 29 through struts 47. The strut 47 is installed inside the strut cover 45. A strut cover flow passage 65 through which cooling air A flows is formed between the strut cover 45 and the strut 47 to cool the strut 47.

As shown in FIG. 2, the outer diffuser 43 of the exhaust diffuser 31 is extended at a front end 43c, located on the axially front side, toward the turbine casing 26 so as to come in contact with a blade ring 48. A gas seal 49 having a ring shape in the radial direction is provided between the exhaust casing 29 and the outer diffuser 43 that is disposed further on the radially inner side than the exhaust casing 29. The outer diffuser 43 is formed integrally in combination with the strut covers 45 and the inner diffuser 44, and is supported at a rear end 43d, located further on the axially rear side than the struts 47, from the exhaust casing 29 through a diffuser support (support member) 50. Thus, a large bending load as well as high thermal stress occurs in the vicinity of a coupled portion 45b of the outer diffuser 43 and the strut cover 45 that is a portion located on the axially downstream side of the strut cover 45 and close to the rear end 43*d* being a load support point.

The diffuser support 50 has a rectangular shape, extends along the axial direction, and is installed annularly at predetermined intervals in the circumferential direction. As shown in FIG. 2, the diffuser support 50 is divided in the circumferential direction into a plurality of support segments 50*a*. Each support segment 50*a* is fastened at one end to the exhaust casing 29 and fastened at the other end to the outer diffuser 43. The support segments 50*a* are fixed to the exhaust casing 29 so that a space S2 of a certain width is formed in the axial direction between the support segments 50*a* that are disposed adjacent to one another in the circumferential direction. The exhaust casing 29 is provided so as to cover the diffuser support 50 from the outside, and a gas seal 51 is provided between the rear end of the exhaust casing 29 and the rear end of the outer diffuser 43. The gas seals 49, 51 serve to seal off an annular space surrounded by the exhaust casing 29 and the outer diffuser 43 respectively from the blade ring 48 and the exhaust chamber 30 adjacent to that space from the axially upstream side and downstream side, and thus block the flow of combustion gas or cooling air in the axial direction.

The exhaust casing 29 is provided with a plurality of first cooling air introduction ports 61 at positions corresponding to the struts 47 in the axial direction, at predetermined intervals in the circumferential direction. The plurality of first cooling air introduction ports 61 can introduce the outside cooling air A into the strut cover flow passage 65 between the strut cover 45 and the strut 47. The exhaust casing 29 is further provided with a plurality of second cooling air introduction ports (cooling air introduction portions) 62 at positions further on the downstream side of the exhaust gas flow passage F than the struts 47 (strut covers 45), at predetermined intervals in the circumferential direction. The plurality of second cooling air introduction ports 62 are openings that introduce the outside cooling air A for the purpose of cooling the outer diffuser 43. The cooling air A cools the outer diffuser 43 through a cooling air flow passage 63, to be described later, and is then supplied to the strut cover flow passage 65, where the cooling air A joins another flow of the cooling air A supplied from the first cooling air introduction ports 61, and cools the struts 47 before being discharged to the combustion gas flow passage F.

The cooling air flow passage 63 is provided which has an annular shape on the radially outer side of the outer diffuser 43 and has a smaller flow passage area than the second cooling air introduction port 62, and through which the cooling air A introduced from the second cooling air introduction port 62 is introduced to the strut cover flow passage 65 between the strut cover 45 and the strut 47.

The cooling air flow passage 63 is formed by disposing an annular non-perforated partition member 64 on the radially outer side of the outer diffuser 43 so as to cover a radially outer surface of the outer diffuser 43, with one end of the partition member 64 located on the axially rear side being a free end not fixed at the end while the other side of the axially front side of the partition member 64 being a fixed end fixed to the surface of the exhaust casing 29 facing the axially rear side. Specifically, the partition member 64 has a cylindrical shape with a larger diameter than the outer diffuser 43. The axially front-side end (one end) of the partition member 64 is fixed to the exhaust casing 29 by welding, while a space Si is provided between the free end that is the axially rear-side end (the other end) of the partition member 64 and the rear end 43*d* of the outer diffuser 43. Thus, the cooling air flow passage 63 is formed between the partition member 64 and the radially outer surface of the outer diffuser 43, and on the outer side of the coupled portion 45*b* of the outer diffuser 43 and the strut cover 45 extending from the outer diffuser 43 toward the axially front side.

As shown in FIG. 2, the partition member 64 is divided at horizontal flanges 64*a* into two partition member parts (upper-half partition member part 64*b*, lower-half partition member part 64*c*), and is disposed annularly around the rotor 32. At the horizontal flanges 64*a*, the upper-half partition member part 64*b* and the lower-half partition member part 64*c* are fastened together with fastening bolts 64*d* (not shown). A seal member 64*e* (not shown) is disposed on the horizontal flanges 64*a*, so that the cooling air A flowing along the outer surface of the non-perforated partition member 64 in the axial direction is prevented from leaking through the horizontal flanges 64*a* and taking a shortcut into the cooling air flow passage 63. The partition member 64 is not limited to being divided into two parts, and may instead be divided into three or more parts.

At startup of the gas turbine, the temperature difference between the exhaust casing 29 and the outer diffuser 43 becomes large, so that the partition member 64 fixed to the exhaust casing 29 and the outer diffuser 43 may approach and interfere with each other in the radial direction. Therefore, the exhaust diffuser 31 including the outer diffuser 43 is mounted so that a minimum clearance can be maintained even when the partition member 64 and the outer diffuser 43 approach closest each other. Specifically, the clearance of the cooling air flow passage 63 is determined by adjusting the radial clearance between the partition member 64 and the outer diffuser 43 during mounting so that a minimum clearance can be maintained during operation. In other words, the cooling air flow passage 63 is set so that a small flow passage cross-sectional area can be maintained during operation. Thus, during operation, the flow velocity of the cooling air A (A1) flowing through the cooling air flow passage 63 is increased, and the performance of the cooling air A cooling the outer diffuser 43 is improved.

The strut cover 45 is provided with a flange 45*a* that is formed as the radially outer end of the exhaust diffuser 31 is increased in diameter and bent toward the outer side. The outer diffuser 43 has an opening 43*a* formed at a position at which the strut cover 45 is coupled. The strut cover 45 and the outer diffuser 43 are coupled together by welding, with the flange 45*a* of the strut cover 45 laid in close contact around the opening 43*a* of the outer diffuser 43. The outer diffuser 43 is supported at the rear end 43*d* by the exhaust casing 29 through the plurality of diffuser supports 50, and the inner diffuser 44 is coupled to the outer diffuser 43 through the plurality of strut covers 45. Accordingly, a bending load acts on the coupled portion 45*b* of the flange 45*a* of the strut cover 45 and the opening 43*a* of the outer diffuser 43. In addition, thermal stress acts especially on the coupled portion 45*b* of the flange 45*a* of the strut cover 45 and the opening 43*a* of the outer diffuser 43, as the outer diffuser 43 is heated by the high-temperature exhaust gas G flowing through the exhaust gas flow passage F. In this embodiment, therefore, the cooling performance of the cooling air A1 flowing through the cooling air flow passage 63 is improved so as to cool the outer diffuser 43 and the coupled portion 45*b* of the strut cover 45 and the outer diffuser 43 and reduce the thermal stress.

With the outer diffuser 43 disposed on the radially inner side of the exhaust casing 29 and the partition member 64 disposed on the radially outer side of the outer diffuser 43, the exhaust casing 29 is provided with a room R having an annular shape between the exhaust casing 29 and the partition member 64. In this case, the plurality of diffuser supports 50 coupling together the exhaust casing 29 and the outer diffuser 43 are disposed in the room R, and the partition member 64 is disposed on the radially inner side of the diffuser supports 50. The second cooling air introduction ports 62 are provided so as to face the partition member 64 from the radially outer side. Thus, the second cooling air introduction ports 62 communicate with the room R, and the cooling air flow passage 63 communicates at one end with the room R and communicates at the other end with the strut cover flow passage 65.

That is, the partition member 64 is disposed on the radially outer side of the outer diffuser 43, and the front end (fixed end) of the partition member 64 located on the axially front side is fixed to the exhaust casing 29, while the space S1 is provided on the side of the rear end (free end) located on the axially rear side. Thus, the second cooling air introduction ports 62 are located on the axially front side relative to the partition member 64, and the space S is located on the axially rear side of the partition member 64, so that a flow passage having an inverted S-shape leading from the second cooling air introduction port 62 to the room R to the space S1 to the cooling air flow passage 63 and to the strut cover 45 is formed. The cooling air flow passage 63 has a smaller passage cross-sectional area than the room R, so that the cooling air flow passage 63 functions as a constriction, where the flow velocity of the cooling air A1 increases.

As shown in FIG. 2, the exhaust casing 29 and the outer diffuser 43 each have a structure divided into upper and lower parts, and have a cylindrical shape as these upper and lower parts are fastened together with bolts at horizontal flanges 29a, 43b. Similarly, the partition member 64 has a structure divided into upper and lower parts, and has a cylindrical shape as these parts are fastened together with bolts at the horizontal flanges 64a.

A negative pressure inside the exhaust diffuser 31 is highest in the vicinity of the axially downstream side of the final-stage blades 28. The cooling air A flowing through the strut cover flow passage 65 cools the strut 47 and is then discharged from the axially upstream end of the inner diffuser 44 into the exhaust diffuser 31 in the vicinity of the final-stage blades 28. As a result, a negative pressure acts inside the strut cover flow passage 65, causing a suction force to act at the cooling air introduction ports 61, 62. Then, outside air is introduced by the suction force from the first cooling air introduction ports 61 into the space between the strut cover 45 and the strut 47. Similarly, outside air is introduced by the suction force from the second cooling air introduction ports 62 through the cooling air flow passage 63 into the strut cover flow passage 65.

Specifically, as shown in FIG. 3, when a suction force acts at the second cooling air introduction port 62, the outside cooling air A is suctioned from the second cooling air introduction port 62 into the room R, passes through the space S2 between the support segments 50a of the diffuser support 50, and reaches the partition member 64. After reaching the partition member 64, the cooling air A flows toward the axially rear side by being guided by the partition member 64, and flows into the cooling air flow passage 63 through the space S1. Thus, the cooling air A flows through the room R toward the axially rear side, turns 180 degrees around to flow toward the axially front side, and reaches the cooling air flow passage 63. In this way, the cooling air A1 flowing through the cooling air flow passage 63 can cool the outer diffuser 43 as well as the coupled portion 45b of the outer diffuser 43 and the strut cover 45.

As described above, the partition member 64 is mounted so that a minimum clearance can be secured between the partition member 64 and the outer diffuser 43 during operation. Thus, during normal operation, the flow velocity of the cooling air A1 passing through the cooling air flow passage 63 is higher than the flow velocity thereof inside the room R or in the vicinity of the diffuser support 50. As a result, the flow rate per unit time of the cooling air A1 increases, and cooling of the outer surface of the outer diffuser 43 is promoted. Accordingly, compared with the conventional structures, the outer diffuser 43 and the coupled portion 45b with the strut cover 45 can be cooled efficiently with a low flow of the cooling air A1.

Conventionally, the exhaust diffuser 31 is cooled with only the cooling air A that is introduced from the first cooling air introduction port 61. In this embodiment, by contrast, part of the cooling air A introduced from the first cooling air introduction port 61 is introduced from the second cooling air introduction port 62, and this part of the cooling air A is used to further cool the exhaust diffuser 31. Although the cooling air A introduced from the second cooling air introduction port 62 is smaller in amount than the cooling air A introduced from the first cooling air introduction port 61, the former increases the flow velocity while passing through the cooling air flow passage 63, and thus can efficiently cool the outer diffuser 43 and the coupled portion 45b with the strut cover 45.

As has been described above, the exhaust system of the first embodiment includes the exhaust casing 29, and the exhaust gas flow passage F is formed by the outer diffuser 43 supported on the radially inner side of the exhaust casing 29 and the inner diffuser 44 disposed on the radially inner side of the outer diffuser 43. The strut cover 45 is coupled at one end to the outer diffuser 43 and coupled at the other end to the inner diffuser 44. The exhaust casing 29 includes the second cooling air introduction ports 62 provided further on the downstream side of the exhaust gas flow passage F than the strut covers 45, and the partition member 64 that has an annular shape so as to cover the radially outer side of the outer diffuser 43 and is supported by the exhaust casing 29. The exhaust casing 29 is further provided with the cooling air flow passage 63 that is provided between the outer diffuser 43 and the partition member 64 and formed so as to guide the cooling air A, introduced from the second cooling air introduction port 62, to the strut cover flow passage 65 inside the strut cover 45.

Accordingly, the cooling air A introduced from the second cooling air introduction port 62 into the exhaust casing 29 passes through the cooling air flow passage 63 and is guided into the strut cover 45. Here, to form the cooling air flow passage 63 with the outer diffuser 43, the partition member 64 having an annular shape so as to cover the outer diffuser 43 from the radially outer side is fixed to the exhaust casing 29. To mount the partition member 64 on the exhaust casing, the partition member 64 is fixed to the exhaust casing 29 so that a minimum clearance to prevent interference with the outer diffuser can be maintained during operation. As a result, the cooling air A1 passing through the cooling air flow passage 63 can efficiently cool the outer diffuser 43 at a lower flow rate than in the conventional structures, so that an increase in amount of cooling air can be suppressed. Moreover, the load placed on the outer diffuser 43 is reduced, as the partition member 64 forming the cooling air flow passage 63 is directly fixed to the exhaust casing 29 instead of being mounted on the outer diffuser 43. Furthermore, as the structure is simplified, the maintainability is also improved.

In the exhaust system of the first embodiment, the partition member 64 is disposed annularly in the axial direction, with the one axial end being a free end not fixed at the end while the other end being a fixed end fixed to the exhaust casing 29. As a result, the cooling air flow passage 63 is disposed so as to form a flow passage leading from the free end toward the fixed end. Accordingly, the entire amount of cooling air introduced forms a flow of the cooling air A1 that turns around at the free end of the partition member and heads for the fixed end, so that the cooling of the outer diffuser is promoted and the cooling air flows smoothly into the strut cover flow passage.

In the exhaust system of the first embodiment, the outer diffuser 43 is supported at one axial end by the exhaust casing 29 through the diffuser supports 50 (support members) disposed annularly in the circumferential direction, and the partition member 64 is disposed on the radially inner side of the diffuser supports 50. Thus, the partition member 64 can be disposed on the radially inner side of the diffuser supports 50 that support the outer diffuser 43. Accordingly, it is possible to reduce the flow passage cross-sectional area of the cooling air flow passage 63 by bringing the partition plate 64 closer to the outer diffuser 43, whereby the flow velocity of the cooling air increases and cooling of the outer diffuser 43 is enhanced.

In the exhaust system of the first embodiment, the diffuser support 50 is formed by the plurality of segments 50*a* divided with the space left in between in the circumferential direction, and the segments 50*a* are mounted so that, when seen from the axial direction, at least one or more of the spaces S2 are provided between the segments 50*a* and the strut covers 45 that are disposed in the circumferential direction. Thus, dispersion of the cooling air A in the circumferential direction is promoted as the cooling air A supplied from the second cooling air introduction port 62 passes through the spaces S2 between the segments 50*a* of the diffuser support 50.

In the exhaust system of the first embodiment, the segments 50*a* of the diffuser support 50 are disposed adjacent to one another in the circumferential direction, and the segments 50*a* fixed at one axial end to the exhaust casing 29 and fixed at the other end to the radially outer wall surface of the outer diffuser 43 are disposed so that the space between the adjacent segments 50*a* has a certain width in the axial direction. Thus, the spaces S2 are formed between the segments 50*a* evenly in the circumferential direction, so that the flow rate of the cooling air A flowing through the cooling air flow passage 63 is evened out in the circumferential direction.

In the exhaust system of the first embodiment, the partition member 64 is divided into a plurality of parts in the circumferential direction, and the seal member 64*e* is provided at each end in the circumferential direction of the divided partition member parts 64*b*, 64*c*. Thus, the partition member parts 64*b*, 64*c* are sealed at both ends with the seal member, so that the cooling air A1 entering the cooling air flow passage 63 flows into the cooling air flow passage 63 from the free end side without taking a shortcut, and the flow of the cooling air is evened out in the circumferential direction. Moreover, as the partition member parts 64*b*, 64*c* can be removed part by part, the maintainability is improved.

In the exhaust system of the first embodiment, the strut cover 45 includes the flange 45*a* that is formed as the other end of the strut cover 45 is increased in diameter and bent outward, and the flange 45*a* is coupled around the opening 43*a* formed in the outer diffuser 43. The cooling air flow passage 63 is provided on the outer side of the coupled portion 45*b* of the strut cover 45 and the outer diffuser 43. Thus, thermal stress due to the exhaust gas G concentrates at the coupled portion 45*b* of the strut cover 45 and the outer diffuser 43, but the cooling air A1 cools the coupled portion 45*b* when passing through the cooling air flow passage 63, so that the thermal stress acting on the coupled portion 45*b* of the strut cover 45 and the outer diffuser 43 can be reduced.

In the exhaust system of the first embodiment, the second cooling air introduction ports 62 are provided so as to face the partition member 64 from the radially outer side. Accordingly, the cooling air A1 introduced from the second cooling air introduction port 62 into the exhaust casing 29 hits the partition member 64 and changes its flow direction, and is thereby evened out in the circumferential direction. Moreover, as the cooling air A1 is guided into the strut cover 45 through the cooling air flow passage 63, the outer diffuser 43 can be cooled with the cooling air A1 evenly in the circumferential direction.

In the exhaust system of the first embodiment, the annular room R is provided between the exhaust casing 29 and the partition member 64. The second cooling air introduction ports 62 communicate with the room R, and the cooling air flow passage 63 communicates at one end with the room R and communicates at the other end with the inside of the strut cover 45. Accordingly, the cooling air A introduced from the second cooling air introduction port 62 into the exhaust casing 29 enters the cooling air flow passage 63 via the room R, so that the cooling air A is evened out in the circumferential direction inside the room R. With this air flow entering the cooling air flow passage 63, the outer diffuser 43 can be cooled with the cooling air A1 evenly in the circumferential direction.

In the exhaust system of the first embodiment, the plurality of second cooling air introduction ports 62 are provided at predetermined intervals in the circumferential direction. Thus, the cooling air A can be introduced into the exhaust casing 29 evenly in the circumferential direction.

The gas turbine of the first embodiment is provided with the compressor 11 that compresses air, the combustor 12 that mixes and combusts the compressed air compressed by the compressor 11 and the fuel, the turbine 13 that obtains rotational power from the combustion gas generated by the combustor 12, and the exhaust system that treats the exhaust gas discharged from the turbine 13. Thus, as this exhaust system can cool the outer diffuser 43 efficiently with a low flow of cooling air, an increase in amount of cooling air can be suppressed as well as an increase in amount of cooling air discharged into the exhaust gas flow passage F can be suppressed. Accordingly, it is possible to prevent a decrease in exhaust gas temperature and maintain the turbine efficiency.

[Second Embodiment]

Figure 5:
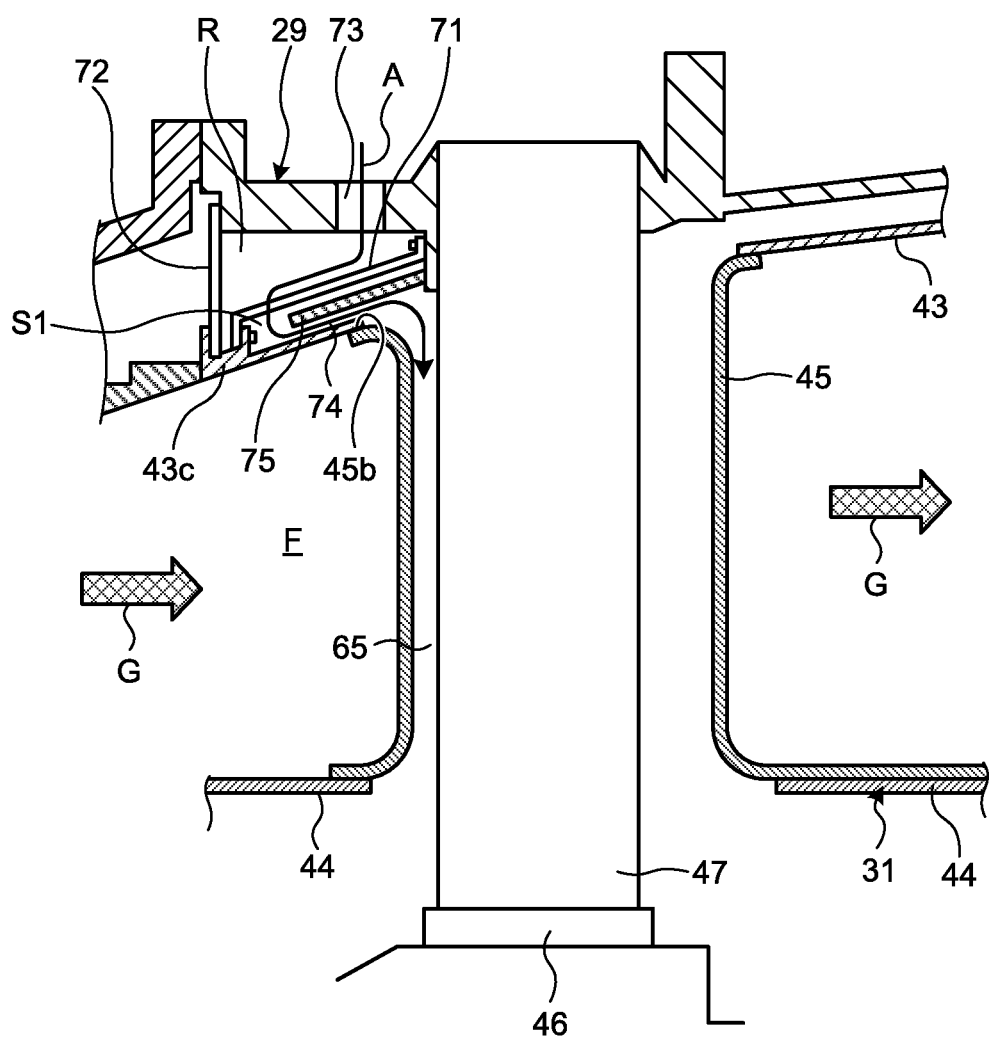
FIG. 5 is a sectional view showing an exhaust system of a second embodiment.

FIG. 5 is a sectional view showing an exhaust system of a second embodiment. Those members that have the same functions as in the above embodiment will be denoted by the same reference signs and a detailed description thereof will be omitted.

As shown in FIG. 5, in the exhaust system of the second embodiment, the exhaust diffuser 31 having a cylindrical shape is disposed inside the exhaust casing 29. The exhaust diffuser 31 is composed of the outer diffuser 43 and the inner diffuser 44 that are coupled together by the strut covers 45. As the inner diffuser 44 is disposed on the radially inner side of the outer diffuser 43, the exhaust gas flow passage F is formed inside the exhaust diffuser 31. The strut 47 is installed inside the strut cover 45.

The outer diffuser 43 is extended at the front end, located on the axially front side, toward the turbine casing 26 and supported from the exhaust casing 29 through a diffuser support (support member) 71. The outer diffuser 43 is extended at the rear end, located on the axially rear side, toward the exhaust chamber (not shown). The exhaust casing 29 is provided so as to cover the diffuser support 71 from the outer side, and a gas seal 72 is provided in the radial direction between the axially front end of the exhaust casing 29 and the axially front end of the outer diffuser 43 that is disposed further on the radially inner side than the exhaust casing 29.

This embodiment is different from the first embodiment in that the strut cover 45, the inner diffuser 44, and the outer diffuser 43 are integrated by welding, and that the outer diffuser 43 is supported at the front end 43c from the exhaust casing 29 through the diffuser support 71.

Accordingly, in this embodiment, a large bending load as well as high thermal stress occurs in the vicinity of the coupled portion 45b of the outer diffuser 43 and the strut cover 45 that is a portion located on the axially upstream side of the strut cover 45 and close to the front end 43c being a load support point.

The exhaust casing 29 is provided with a plurality of second cooling air introduction ports (cooling air introduction portions) 73 at positions further on the upstream side of the exhaust gas flow passage F than the struts 47 (strut covers 45), at predetermined intervals in the circumferential direction. The plurality of second cooling air introduction ports 73 can introduce the outside cooling air A through the outer side of the outer diffuser 43 into the strut cover flow passage 65 between the strut cover 45 and the strut 47.

A cooling air flow passage 74 provided on the outer diffuser 43 is formed as a partition member 75 having an annular shape is disposed on the radially outer side of the outer diffuser 43. The partition member 75 has a cylindrical shape with a larger diameter than the outer diffuser 43. A fixed end (the other end) of the partition member 75 that is the axially rear-side end is fixed to the exhaust casing 29 by welding, while the space S1 is provided on the side of a free end (one end) thereof that is the axially front-side end. Thus, the cooling air flow passage 74 is formed by the partition member 75 on the outer side of the outer diffuser 43 and on the outer side of the coupled portion 45b of the strut cover 45 and the outer diffuser 43.

With the outer diffuser 43 disposed on the radially inner side of the exhaust casing 29 and the partition member 75 disposed on the radially outer side of the outer diffuser 43, the exhaust casing 29 is provided with the room R having an annular shape between the exhaust casing 29 and the partition member 75. In this case, the plurality of diffuser supports 71 coupling together the exhaust casing 29 and the outer diffuser 43 are disposed inside the room R, and the partition member 75 is disposed on the radially inner side of the diffuser supports 71. The second cooling air introduction ports 73 are provided so as to face the partition member 75 from the radially outer side.

Accordingly, when a negative pressure acts inside the strut cover flow passage 65, a suction force acts at the second cooling air introduction ports 73. As a result, outside air is introduced from the second cooling air introduction ports 73 through the cooling air flow passage 74 into the strut cover flow passage 65 between the strut cover 45 and the strut 47.

Specifically, when a suction force acts at the second cooling air introduction port 73, the outside cooling air A is suctioned from the second cooling air introduction port 73 into the room R, passes through the space between the diffuser supports 71, and reaches the partition member 75. After reaching the partition member 75, the cooling air A flows toward the axially front side by being guided by the partition member 75, and flows through the space S1 into the cooling air flow passage 74. Thus, the cooling air A flows through the room R toward the front side, turns 180 degrees around to flow toward the axially rear side, and reaches the cooling air flow passage 74. In this way, the cooling air A1 flowing through the cooling air flow passage 74 can cool the outer diffuser 43, as well as can cool the vicinity of the coupled portion 45b of the outer diffuser 43 and the strut cover 45 that is located on the axially upstream side and subjected to high thermal stress.

The partition member 75 is mounted in the exhaust casing 29 so that a minimum clearance can be secured between the partition member 75 and the outer diffuser 43 during operation. Accordingly, the flow velocity of the cooling air Al inside the cooling air flow passage 74 is higher than in the conventional structures. Thus, cooling of the outer surface of the outer diffuser 43 is promoted, and the outer diffuser 43 and the coupled portion with the strut cover 45 can be cooled efficiently with a smaller amount of cooling air A than in the conventional structures. Moreover, the load placed on the outer diffuser 43 is reduced, as the partition member 75 forming the cooling air flow passage 74 is directly fixed to the exhaust casing 29 instead of being mounted on the outer diffuser 43. Furthermore, as the structure is simplified, the maintainability is improved.

[Third Embodiment]

Figure 6:
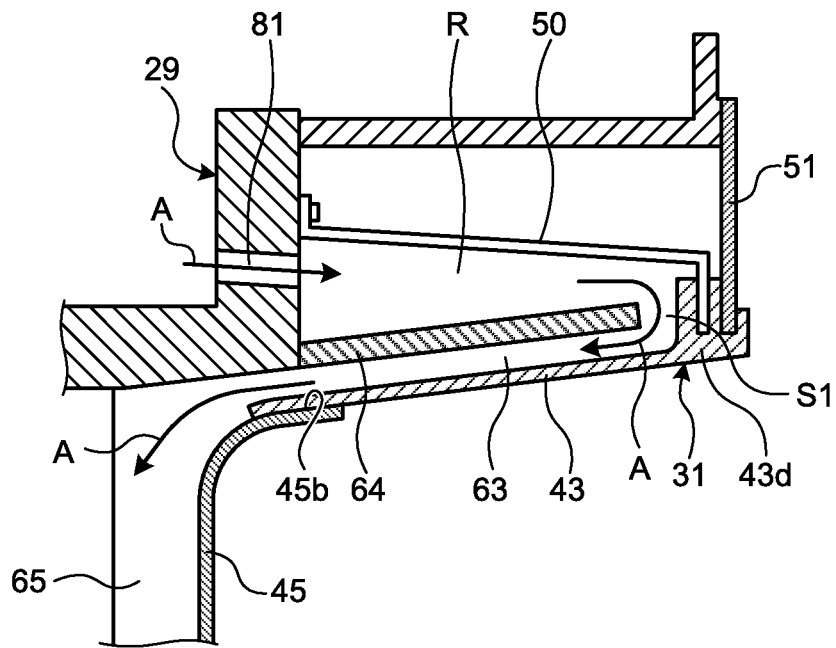
FIG. 6 is a sectional view showing major parts of an exhaust system of a third embodiment.

FIG. 6 is a sectional view showing major parts of an exhaust system of a third embodiment. Those members that have the same functions as in the above embodiments will be denoted by the same reference signs and a detailed description thereof will be omitted.

As shown in FIG. 6, in the exhaust system of the third embodiment, the exhaust casing 29 is provided with a plurality of second cooling air introduction ports 81 at positions further on the downstream side of the exhaust gas flow passage F than the strut covers 45, at predetermined intervals in the circumferential direction. The plurality of second cooling air introduction ports 81 communicate with the room R that is located further on the radially inner side than the diffuser supports 50 and further on the radially outer side than the partition member 64. The configurations of the cooling air flow passage 63 and the partition member 64 are the same as in the first embodiment.

Thus, in the third embodiment, the second cooling air introduction ports 81 are provided in the exhaust casing 29, further on the upstream side of the exhaust gas flow passage F than the strut covers 45. Moreover, the partition member 64 fixed to the exhaust casing 29 is disposed so as to form an annular shape on the radially outer side of the outer diffuser 43, and the cooling air flow passage 63 is formed between the exhaust casing 29 and the outer surface of the outer diffuser 43. The cooling air flow passage 63 communicates at the upstream side with the room R and communicates at the downstream side with the strut cover flow passage 65.

Thus, the outside cooling air A can be introduced into the room R without being interrupted by the diffuser supports 50, so that the outer diffuser 43 can be cooled efficiently with a lower flow of the cooling air A than in the conventional structures.

[Fourth Embodiment]

Figure 7:
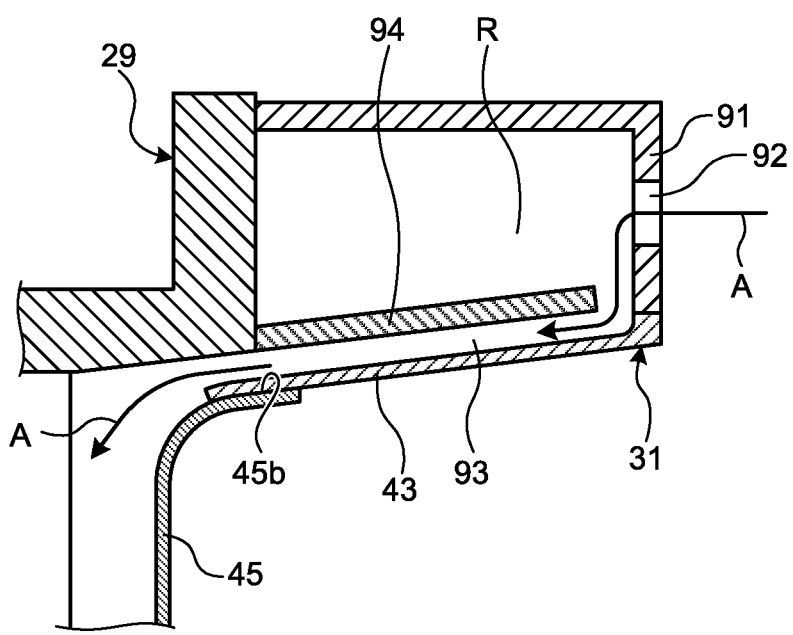
FIG. 7 is a sectional view showing major parts of an exhaust system of a fourth embodiment.

FIG. 7 is a sectional view showing major parts of an exhaust system of the fourth embodiment. Those members that have the same functions as in the above embodiments will be denoted by the same reference signs and a detailed description thereof will be omitted.

In the exhaust system of the fourth embodiment, as shown in FIG. 7, the exhaust diffuser 31 having a cylindrical shape is disposed inside the exhaust casing 29. The exhaust diffuser 31 is composed of the outer diffuser 43 and the inner diffuser 44 that are coupled together by the strut covers 45. The outer diffuser 43 is coupled at the rear end to a support member 91 of the exhaust casing 29.

The exhaust casing 29 is provided with a plurality of second cooling air introduction ports (cooling air introduction portions) 92 in the support member 91 at positions further on the downstream side of the exhaust gas flow passage F than the strut covers 45, at predetermined intervals in the circumferential direction. Alternatively, the exhaust casing 29 and the support member 91 may be integrally formed, and the second cooling air introduction ports 92 may be formed in the exhaust casing 29. The plurality of second cooling air introduction ports 92 can introduce the outside cooling air A through the outer side of the outer diffuser 43 into the strut cover flow passage 65 between the strut cover 45 and the strut 47. Moreover, a cooling air flow passage 93 is provided between the outer diffuser 43 and the partition member 64 that is fixed to the exhaust casing 29 and disposed so as to form an annular shape on the radially outer side of the outer diffuser 43. Accordingly, the cooling air A introduced from the second cooling air introduction ports 92 flows temporarily into the room R surrounded by the exhaust casing 29 and the partition member 64, flows through the cooling air flow passage 93, and is introduced into the strut cover flow passage 65.

Thus, the structure on the upstream side of the cooling air flow passage 93 is simplified, and a pressure loss occurring on the path leading to the cooling air flow passage 93 is reduced. Moreover, the cooling air A flowing through the cooling air flow passage 93 can cool the outer diffuser 43 as well as the coupled portion of the outer diffuser 43 and the strut cover 45.

REFERENCE SIGNS LIST

11 Compressor
12 Combustor
13 Turbine
29 Exhaust casing
29a, 43a, 64a Horizontal flange
30 Exhaust chamber
31 Exhaust diffuser
32 Rotor (rotating shaft)
43 Outer diffuser
43b Horizontal flange
43c Front end
43d Rear end
44 Inner diffuser
45 Strut cover
45a Flange
45b Coupled portion
47 Strut
50, 71 Diffuser support (support member)
50a Support segment
61 First cooling air introduction port
62, 73, 81, 92 Second cooling air introduction port (cooling air introduction portion)
63, 74, 93 Cooling air flow passage
64, 75, 94 Partition member
64b, 64c Partition member part
64e Seal member
65 Strut cover flow passage
G Exhaust gas (combustion gas)
F Exhaust gas flow passage
R Room
S1, S2 Space

The invention claimed is:

1. An exhaust system comprising:
a casing having an annular shape;
an outer diffuser having an annular shape and supported on a radially inner side of the casing;
an inner diffuser having an annular shape and disposed on a radially inner side of the outer diffuser to form an exhaust gas flow passage between the inner diffuser and the outer diffuser;
a strut cover having a cylindrical shape, and the strut cover being coupled at a first end in a longitudinal direction to the outer diffuser and coupled at a second end to the inner diffuser;
a cooling air introduction portion provided in the casing, further on an upstream side or a downstream side of the exhaust gas flow passage than the strut cover;
a partition member having an annular shape so as to cover a radially outer side of the outer diffuser and supported by the casing, the partition member being non-perforated and disposed annularly in the axial direction and having a free first axial end such that a space is formed between the free first axial end and a rear end of the outer diffuser, and having a fixed second axial end fixed to the casing; and
a cooling air flow passage provided between the radially outer side of the outer diffuser and the partition member and formed so as to guide cooling air, introduced from the cooling air introduction portion, from the space at the free first axial end of the partition member toward the fixed second axial end of the partition member and to a strut cover flow passage inside the strut cover.

2. The exhaust system according to claim 1, wherein the outer diffuser is supported at a first axial end by the casing through a support member disposed annularly in a circumferential direction, and
the partition member is disposed on the radially inner side of the outer diffuser relative to the support member.

3. The exhaust system according to claim 2, wherein the support member is formed by a plurality of segments divided with one of a plurality of certain spaces left in between adjacent pairs of the plurality of segments in the circumferential direction, and
the plurality of segments are mounted so that, when viewed from an axial direction, at least one of the certain spaces is provided between the plurality of segments and a plurality of strut covers that are disposed in the circumferential direction.

4. The exhaust system according to claim 3, wherein the plurality of segments are disposed adjacent to one another in the circumferential direction, and
the plurality of segments fixed at the first axial end to the casing and fixed at a second axial end to the radially outer side of the outer diffuser are disposed so that the one of the certain spaces between each of the adjacent pairs of the plurality of segments has a certain width in the axial direction.

5. The exhaust system according to claim 3, wherein the cooling air introduction portion is arranged so as to face the partition member from the radially outer side of the outer diffuser.

6. The exhaust system according to claim 1, wherein the partition member is divided into a plurality of parts in a circumferential direction, and a seal member is provided at each end of each of the plurality of parts in the circumferential direction of the plurality of parts.

7. The exhaust system according to claim 1, wherein the cooling air flow passage is provided on an outer side of a coupled portion of the strut cover and the outer diffuser.

8. The exhaust system according to claim 1, wherein a room having an annular shape is provided between the casing and the partition member, and
the cooling air introduction portion communicates with the room, and the cooling air flow passage communicates at the first end thereof with the room and communicates at the second end thereof within the strut cover.

9. The exhaust system according to claim 1, wherein a plurality of the cooling air introduction portions are provided at predetermined intervals in the circumferential direction.

10. A gas turbine comprising:
a compressor that compresses air;
a combustor that mixes and combusts compressed air compressed by the compressor and fuel;
a turbine that obtains rotational power from combustion gas generated by the combustor; and
the exhaust system according to claim 1 that treats exhaust gas discharged from the turbine.

11. The exhaust system according to claim 1, wherein the outer diffuser is supported at a first axial end by the casing through a support member disposed annularly in a circumferential direction, and
the partition member is disposed on the radially inner side of the outer diffuser relative to the support member.

12. The exhaust system according to claim 11, wherein the support member is formed by a plurality of segments divided with one of a plurality of certain spaces left in between adjacent pairs of the plurality of segments in the circumferential direction, and
the plurality of segments are mounted so that, when viewed from an axial direction, at least one of the certain spaces is provided between the plurality of segments and a plurality of strut covers that are disposed in the circumferential direction.

13. The exhaust system according to claim 12, wherein the plurality of segments are disposed adjacent to one another in the circumferential direction, and
the plurality of segments fixed at the first axial end to the casing and fixed at a second axial end to the radially outer side of the outer diffuser are disposed so that the one of the certain spaces between each of the adjacent pairs of the plurality of segments has a certain width in the axial direction.

* * * * *